United States Patent [19]

Gerstin et al.

[11] 3,887,756

[45] June 3, 1975

[54] POLYMER-BASE PAINTED RESIN CURED UNSATURATED ELASTOMERIC SUBSTRATES

[75] Inventors: Jeffrey M. Gerstin, East Brunswick; Lawrence Spenadel, Westfield, both of N.J.

[73] Assignee: Exxon Research and Engineering Company, Linden, N.J.

[22] Filed: Dec. 26, 1972

[21] Appl. No.: 318,020

[52] U.S. Cl. ............................................. 428/425
[51] Int. Cl. ...................... B32b 25/08; B44d 1/22
[58] Field of Search ............ 117/138.8 E, 139, 161, 117/33; 260/846, 847, 848

[56] References Cited
UNITED STATES PATENTS

| | | | |
|---|---|---|---|
| 2,874,068 | 2/1959 | Von Spulak | 117/72 |
| 3,054,755 | 9/1962 | Windemuth et al. | 260/2.5 |
| 3,287,440 | 11/1966 | Giller | 260/846 |
| 3,528,848 | 9/1970 | Zoebelein | 117/138.8 |
| 3,534,119 | 10/1970 | Relya | 260/848 |
| 3,607,360 | 9/1971 | Elmer | 117/72 |
| 3,637,576 | 1/1972 | Sutherland | 260/38 |
| 3,709,848 | 1/1973 | Gerstin et al. | 260/19 UA |
| 3,764,365 | 10/1973 | Duncun et al. | 117/33 |

FOREIGN PATENTS OR APPLICATIONS

| | | |
|---|---|---|
| 867,509 | 5/1961 | United Kingdom |
| 987,827 | 3/1965 | United Kingdom |

*Primary Examiner*—P. E. Willis, Jr.
*Attorney, Agent, or Firm*—E. V. Haines; W. T. Clarke

[57] ABSTRACT

Polymer-base paints, such as acrylic or urethane paints, are used as coatings on substrates of elastomeric compositions which are heat cured compositions in which the elastomer has at least 0.5 mole percent unsaturation. These elastomeric substrates are formulated with a heat reactive phenol-formaldehyde type resin, a metal oxide or halide, the metals of which are selected from Groups IIB, IIIB, IVB or VIII of the Periodic Table and an additional halogen donor in the event that the other components bear no halogen groups. The elastomeric substrate may also contain fillers, such as carbon blacks, finely divided silica, talcs, or clays and plasticizers such as a naphthenic type oil. The halogen employed is chlorine or bromine. Optionally, the heat reactive resins are chlorine- or bromine-substituted alkylated phenolformaldehyde resins. These are preferably employed. The painted elastomeric compounds are used as sight shields, door gaskets, bumper guards, rub strips, grill housings, tire sidewalls and so forth, in the automotive manufacturing industry.

14 Claims, No Drawings

POLYMER-BASE PAINTED RESIN CURED UNSATURATED ELASTOMERIC SUBSTRATES

The present invention is directed to the production for the automotive industry of special elastomeric substrates coated with polymer-based paints and having defined special uses in the automotive industry as sight shields, door gaskets, bumper guards, rub strips, grill housings, tire sidewalls and the like wherein the special properties are those requiring high degrees of flexibility, modulus, tensile strength, elongtion, tear strength and especially adhesion of polymeric-based paints to such elastomeric compositions so that under all conditions of use the paint coatings retain their characteristic gloss, smooth surface and adhesion to the substrate to which they are adhered.

In the past, various synthetic elastomers have been prepared and have found special uses because of their peculiar properties. It has long been known that certain synthetic elastomers such as butyl rubber, halobutyl rubber, the EPDM terpolymer rubbers and the like could be cured with the phenolformaldehyde type resins to produce cured or vulcanized elastomeric compositions exhibiting unusual properties with respect to aging, ultraviolet light resistance, flexibility, modulus, tear strength and so forth. Such properties in such compounds are clearly illustrated by the disclosures contained in Giller 3,287,440, who discloses many types of synthetic rubbers containing halogen donor type compounds and cured with phenolformaldehyde type resins. The resin employed may be an alkyl phenolformaldehyde resin or a halomethyl alkylated phenolformaldehyde resin such as the bromomethyl p-isooctyl phenol-formaldehyde resins marketed by the Schenectady Chemical Company under the tradename "SP1055" or "SP1056." Giller does teach that in order to satisfactorily secure a curing or vulcanization of the various unsaturated synthetic elastomers such as butyl rubber, EPDM or butadiene-styrene rubber, halogen donors either in the form of a halogenated resin or in the form of halogenated elastomers are required in order to secure a good cure or vulcanization. Additionally, British Pat. Specification No. 987,827 discloses the same type of curing procedure.

The chloro- or bromomethyl alkylated phenolaldehyde type resins are disclosed in Braidwood, U.S. Pat. No. 2,972,600 and in improved forms in U.S. Pat. Nos. 3,093,162 and 3,165,496. These patents as well as the Giller patent are incorporated herein by reference.

Additionally, either as original starting rubbers or as halogen donors, various types of heretofore produced elastomers may be employed. For example, chlorinated and brominated butyl rubbers are fully and completely disclosed in U.S. Pat. Nos. 2,720,479, 2,732,354, 2,955,103, 3,042,662 and lastly 2,291,403 discloses chlorinated or brominated polyisobutylene which, although not strictly speaking a true elastomer, nevertheless serves the function of a halogen donor compound. Furthermore, the chlorinated or brominated ethylene-propylene-diene (EPDM) terpolymers which are rubbery in character are fully disclosed in U.S. Pat. No. 3,524,826 and lastly the halogenated, i.e. either chlorinated or brominated, ethylene-propylene copolymer rubbers are disclosed in U.S. Pat. Nos. 3,062,795 and 3,084,145. The straight unhalogenated terpolymers are shown in U.S. Pat. Nos. 3,093,621, 3,280,082, 3,151,173 (column 3), 2,933,480 and 3,000,866. All of these patents are incorporated into this specification by reference since they serve as suitable reactants in forming the elastomeric substrates employed herein. One of the preferred elastomeric halogen donors is sold under the Tradename Hypalon 40 which is generally believed to be chlorosulfonated polyethylene containing about 34.5% chlorine, about 0.9 % sulfur and has a Mooney Viscosity of about 55 measured at 212°F.

The basic elastomeric compositions employed in preparing the present novel composition are those synthetic and natural elastomers in which there is at least 0.5 mole percent of unsaturation. These compounds can range from natural rubber (polyisoprene) or synthetic natural rubber (synthetic polyisoprene) which is most highly unsaturated down to butyl rubber which contains around 0.5 mole percent unsaturation or slightly higher. Suitable elastomers are, for example, natural rubber, polyisoprene, polybutadiene, EPDM terpolymers, butyl rubber, butadiene-acrylonitrile rubbery copolymers, styrene-butadiene rubbers and in fact any synthetic or natural rubber containing at least 0.5 mole percent of unsaturation. The low unsaturation synthetic elastomers of 0.5 to 5.0 mole percent unsaturation are preferred, such as EPDM terpolymers and butyl rubbers.

When EPDM is to be employed in the instant elastomer substrate composition, it has been found to be essential that the third monomer employed must be an alkylidene norbornene such as 5-methylene-2-norbornene (MNB), 5-ethylidene-2-norbornene (ENB) 5-propylidene-2-norbornene (PNB), and the like. Excluded are the EPDM rubbers wherein the third monomer is 1,4-hexadiene or dicyclopentadiene. It has been discovered that the use of such last named terpolymers, in association with the other components of the substrate, does not give a satisfactory cured elastomer or vulcanizate.

The desired unsaturated base elastomers are further compounded with a heat reactive phenol-aldehyde type condensation resin which is either unhalogenated or contains chlorine or bromine groups chemically attached. Resins such as Amberol ST-137, which is a trade designation for a mixture of multicyclic dimethylol phenol-aldehyde condensation products, made by condensing one mole of octyl phenol with two moles of formaldehyde in the presence of one mole of sodium hydroxide and neutralized, may be used as such if a halogen donor is otherwise present. Alternatively, a halogenated resin may be used if no other halogen donor is employed. Most preferably, however, the compounds formed in accordance with the teachings of Braidwood, Fusco and others as evidenced by the disclosure in U.S. Pat. Nos. 2,972,600, 3,109,163 and 3,165,496 are useful in curing or vulcanizing the unsaturated polymers. Peroxides and the usual sulfur cures for the purposes of the present invention are not useful since the resultant vulcanizates lack the necessary adhesion quality for coating with the polymer-based paints aforementioned. Another particularly preferred halogen containing heat reactive resin is sold under the trade name SP1055 and contains roughly about 4% bromine in a resin formed by condensing a polyisooctyl phenol with 2 moles of formaldehyde in a caustic soda solution and neutralizing the resultant condensed product. A variation of this resin is sold under the tradename SP1056 and is quite similar to the aforementioned resin but contains additional bromine to about 6.0%. As above mentioned these last two materials are disclosed in U.S. Pat. Nos. 2,972,600, 3,093,163 and 3,165,496.

Phenol formaldehyde type resins may be employed in affecting the curing of the admixed elastomer composition in their nonhalogenated form provided that the halo donor or activator is present or that the metal catalyst component contains halide groups. It is only essential that a chlorine or bromine atom which is sufficiently active be present in the admixture so that in the event that the metal component present is in the form of the oxide and not the halide, the metal halide will be formed in situ under the conditions applied in the mixing or curing operation. This, of course, is not a necessary condition in the event that the metal halide is employed in the first place.

The halogen donor or activator component of the substrate admixture may be any rubbery compound or elastomer which contains chlorine or bromine in an available form so that it is capable of reacting with, for example, a metal oxide. The various compounds which may be employed are as follows: chloro- or bromobutyl rubber, the chloro- and bromo- EPDM terpolymers such as chloro- or bromo-terpolymers of ethylene and propylene combined with a third monomer which is an alicyclic fused or bridged multiring non-conjugated diene or a non-conjugated acyclic or cyclic diolefin, chlorosulfonated polyethylene (Hypalon), chloro- or bromopolyisobutylene, chloro- or bromoethylene-propylene copolymer rubbers and the like. The essential characteristic of these halogen donor or activators is that they have the ability to react with such metal oxides as zinc oxide, iron oxide or tin oxide.

The catalytic agent employed is of the type disclosed in Giller, U.S. Pat. No. 3,287,440 namely oxides or halides of the metals of Group IIB, IIIB, IVB and VIII of the Periodic System as shown at page 30 of "Advanced Inorganic Chemistry" by F. A. Cotton and G. Wilkinson, Interscience Publishers, N.Y.C. (1962). Preferably the oxides, chlorides or bromides are those of zinc or tin. Any of the metals of the aforementioned groups may be employed but these specific ones are for all practical purposes those that are preferred.

The usual fillers, plasticizers and the like may also be employed. Thus, for example, various types of carbon blacks or non-black fillers may be employed as is conventional in the rubber compounding art. In addition to the various types of black that are customarily used, one may also employ finely divided silica, talc or the acidic clays. Additionally plasticizer oils particularly the naphthenic oils (ASTM type 103) are employed in amounts customarily employed for plasticizing rubber compositions.

Per 100 parts of unsaturated elastomer employed in compounding the substrate composition one may add from 1-25 phr of the halogenated or unhalogenated phenol formaldehyde heat curable resin, preferably between about 5 and about 20 phr. One may add between about 0.5 and about 50 phr, preferably 5 to 20 phr of an elastomeric halogen donor or activator, e.g. the chlorinated or brominated elastomers. Further the metallic compound added is generally added to the extent of 0.5 to about 20 phr preferably 1 to 10 phr for additionally activating the reaction. In the case of zinc oxide, which can function as a filler as well as a cure activator, more than is required for activation can be used, i.e., from 1-100 phr, preferably 5-25 phr. Finally, other fillers and plasticizer oils are used in the amounts conventionally employed in rubber vulcanizates, i.e., from 5 to 300 phr, preferably 50 to 250 phr of filler, and from 5 to 200 phr preferably 20 to 150 phr of plasticizer oil is employed.

The order of mixing of the ingredients in forming the elastomeric substrate is not critical. Thus, for example, a Banbury mixer may be employed in which a masterbatch is formulated by adding for example 100 parts by weight of the unsaturated elastomer along with for example the desired amount of chlorosulfonated polyethylene followed by the addition of zinc oxide, small amount of stearic acid and all or a portion of the carbon black with continued mixing. There is thereafter added any remaining portion of the carbon black not originally added and all of the plasticizer naphthenic mineral oil to be incorporated. This is then mixed for an additional 2½ to 3 minutes to a maximum temperature of about 270°F. Thereafter the resin is added and the material continued to be admixed at a maximum of about 270°F. Thereafter the material is fed onto the cooling and stripping rolls, stripped from the colder roll and sent to a conveyor cooler or direct to an extruder.

Instead of mixing in the manner aforedescribed, to the mixer there may be added all of the carbon black and unsaturated rubber together with the stearic acid, metal oxide, metal halide or haloelastomeric donor, plasticizer, and heat curable resin. Mixing may be carried out for 3 to 15 minutes, preferably 4 to 7 minutes at a temperature not to exceed 270°F. So far as the adhesion property with the polymer based paints is concerned, neither the order of admixture of the ingredients contained in the substrate elastomer composition nor the mixing conditions seem to be particularly critical. Another method of mixing and one commonly used in the rubber industry when elastomeric compositions are to be stored for extended periods of time prior to vulcanization, is one where a master batch is formed containing all ingredients except the resin. The resin is added in a second and distinct mixing step with maximum times and temperatures comparable to those immediately hereinbefore set forth. So long as a homogeneous and uniform elastomeric composition is secured, the final adhesion properties of this substrate elastomer composition seem to be attained.

Once the composition has been mixed, forming and vulcanization of the admixed elastomer substrate composition is carried out at a temperature between about 280°–450°F. for a period of time between about 0.5 and about 120.0 minutes, preferably heat at a temperature between about 320° and about 400°F. for a period of time between about 1.0 to 15.0 minutes. In all cases in the following examples after such curing has been carried out, the tensile strength, elongation, modulus at 300%, tear strength, etc. are all found to be satisfactory for these cured rubbers for the uses and purposes for which they are intended, i.e., as sight shields, door gaskets, bumper guards, rub strips, grille housings, tire sidewalls and the like in the automotive manufacturing industries.

Once formed and vulcanized into the desired shape by conventional extrusion, molding or calendering procedure, the cured elastomeric substrates are then dipped, brushed or sprayed with polyurethane resins in the form of paint compositions, i.e., in their solvent vehicle forms. The usual urethane paint compositions conventionally used in the automotive industry are the ones that are employed in the instant case. Suitable conventional primers are normally applied prior to the dipping, brushing or spraying of the urethane paints thereon. In practical and commercial practice, conventional cleaning procedures, such as brushing, spraying, wiping, dipping or vapor degreasing using detergent solutions, water, hydrocarbon solvents, alcohols, esters, ketones, halogenated aliphatic hydrocarbons, etc. may be employed to remove surface contamination prior to painting. It has been found, however, that excellent adhesion is obtained without preliminary or primary treatment other than cleaning in the case of urethane paints and the aforedescribed resin cured elastomeric substrates.

In case of many elastomers, particularly those nonpolar, low unsaturation hydrocarbon polymers, such as butyl, halobutyl and EPDM, cured with conventional sulfur, peroxide, or sulfur donor cure systems, a poor adhesion results unless the rubbers are first treated with ultraviolet light, ozone, corona discharge, chemical activating agents, etc. prior to the application of the polymer based paint. No such pretreatment is required for good adhesion in the case of the aforementioned types of cured elastomeric substrates.

Urethane based coatings, i.e., polyols, copolymerized with diisocyanates are especially useful and especially will adhere to the aforementioned resin cured elastomeric substrates. See Chapter 12 beginning at page 435 "Film-Forming Compositions," Part I, Vol. 1, Treatise on Coatings, Myers and Long, Marcel Dekker, Inc. New York (1967). Since the elastomeric substrates retain all of the properties of elastomers, the unique stretchability and flexibility of the urethane coatings affords a particularly desirable excellent adhesion between substrate and polymer based coating. Such so-coated resin cured elastomeric substrates provide excellent appearance, excellent wear, high gloss and excellent initial and aged adhesion. They are peculiarly adapted for use as aforementioned in the automotive manufacturing industry.

The most common method of use is the application of a primer, baking, and subsequent application, with intervening solvent flash periods, of successive layers, usually two layers or passes. Both curing (enamel) and non-curing (lacquer) type urethane paints may be employed, but best results are obtained with a lacquer type primer.

In place of naphthenic plasticizer oils, such as those marketed as Flexon 766 and Flexon 791, Sunpar 2280 or Tufflo 6204, other types of oils may be used. Paraffinic base plasticizer oil marketed as Flexon 885 or Tufflo 6056, or white mineral oils marketed as Primol 355 may also be conveniently used. Satisfactory test pads were produced in which 35, 50, 70 and 100 phr of these types and grades of plasticizer oils were used.

One or more of three methods were employed to determine the degree of adhesion of the urethane paints to the rubbery substrates.

In one method (X-cutting) the painted elastomeric pads are cut with a sharp pointed knife in an X shape consisting of two bisecting lines about 3.0 inches long and intersecting at an angle of 25° ± 5° through the paint film into the substrate. The X is then covered with pressure sensitive tape 0.75 inches wide conforming to JAN-P-127, Class III, Grade B-3M Scotch No. 710 or equivalent so that the tape is centered over the intersection and extending for at least 1.5 inches on both sides of the intersection in the direction of the 25° angles, while providing a loose end or "tail" about 3.0 inches beyond this point on one side to grasp when removing tape. The tape is pressed down on the paint surface with a hard rubber roller to insure removal of air bubbles and complete contact between tape and paint surface.

After about 10 seconds, the loose end or tail is grasped between thumb and forefinger and pulled perpendicular to the paint film. The percent area of paint not removed by the tape in a standard tape area of 0.75 × 3.0 inches (2.25 square inches) is visually estimated. The paint adhesion rating is stated as the percent of area of paint remaining on the standard tape test area. Any removal of paint from the substrate is considered as indicative of paint-substrate bond deterioration which condition is not acceptable to the various automotive applications, e.g. sight shields, weather strips, cosmetic strips etc.

The water immersion test is carried out by immersing the painted test pads to the extent of two-thirds of their length (with no less than one-fourth inch between panels, if several panels are simultaneously tested) in deionized water for 10 days at 90°F. The so subjected panels are then removed, blown off with air and examined for blistering, dulling, yellowing, or loss of adhesion of the finish paint coating. Any failures within one-fourth inch from edges, bolt holes, or joints are disregarded.

Still a third test, known as the thermal shock test is also used to determine the adhesiveness of the paint coatings to the elastomer substrates. This test involves immersion of a coated pad for 4 hours in distilled water at 100°F. followed by immediate immersion in an air chamber for 4 hours at −20°F. followed by the application of 90 ± 10 psi saturated steam to an "X" cut area as previously described in the X cut adhesion. Impinging steam must not lift the coating from the pad more than one-sixteenth inch from the X cut.

The following examples are given for the purpose of illustrating the general character and nature of the novel composition but it is not intended that the invention be limited thereto.

EXAMPLE 1

100 parts of an EPDM rubber containing about 4 wt. % of 5-ethylidene norbornene (ENB) as the third monomer was admixed in a Banbury mixer with 70 phr of FEF carbon black, 70 phr of SRF carbon black, 70 phr of plasticizer oil Flexon 580, a naphthenic oil of 82 SSU at 210°F., 5 phr of zinc oxide, 1 phr of stearic acid, 5 phr of Hypalon 40, a chlorosulfonated polyethylene, and 15 phr of SP 1055, a bromomethyl p-isooctyl phenolformaldehyde heat reactive resin. Aliquots of this compounded composition were steam cured at a temperature of 320°F. for 20 minutes and other aliquots were press cured at 320°F. for 20 minutes, both in the form of standard sheet pads of about 0.085 inches thickness, vulcanized, and cut in accordance with the procedures of ASTM D-15.

All cured pads were then sprayed with a polyurethane based sprayable liquid solvent coating composition with and without a primer first being used. In both cases, primer used and not used, and in both cases, steam cured and press cured, all of the spray painted cured pads baked at 225°F. for about 15 minutes, showed good or excellent paint adhesion, when picked at with a finger nail. Further and more rigorous testing was not carried out on these pads.

A further series of test cured identically formulated EPDM compositions (except as noted below) was prepared and sprayed with the same primed and unprimed polyurethane paint compositions described in Example 1. Some of the same and some different ENB content third monomer EPDM elastomers were used. In all cases, however, conventional sulfur curing systems were used and no resins of any type were employed. In all cases, if test pads were primed, unsatisfactory adhesion was attained, while in the case of unprimed pads, a minor portion of them showed reasonably good adhesion, all others failing the elementary finger nail adhesion tests. No other tests were carried out on these pads.

EXAMPLE 2

A masterbatch of compounded elastomer was prepared containing the following ingredients, the numerical values being in parts by weight.

TABLE I

| Component | MASTERBATCH Material | Parts by Weight |
|---|---|---|
| A | EPDM rubber | 100 |
| B | FEF carbon black | 70 |
| C | SRF carbon black | 70 |
| D | Plasticizer Oil | 70 |
| E | Stearic Acid | 1.0 |
| F | Zinc Oxide | 5.0 |
| G | Chlorosulfonated Polyethylene | 5.0 |
| | | 221.0 |

Masterbatch I was prepared by admixing initially, in a Banbury mixer, all of the materials, in order, (B), (E), (F), (D), (C), (G) and (A). Mixing was continued until the composition was homogeneous or for about 5–7 minutes to a temperature of 270° to 300°F. In a subsequent mixing step, Compound I was prepared by taking 221 parts by weight of Masterbatch I and admixing with it 15 parts by weight of a bromomethyl octylphenolformaldehyde, heat reactive resin (Component H) in a Banbury mixer until the composition was homogeneous or for about 2–4 minutes to a maximum temperature of 270°F. Thereafter, Compound I was sheeted out to a thickness of about 0.085 inches and standard blanks cut therefrom as in Example 1. These pads were compression molded (vulcanized) for 15 to 30 minutes at 320°–330°F. The cured pads were then spray painted with a commercially available automotive flexible urethane lacquer primer and finally an enamel topcoat. The lacquer primer was applied to a thickness of 0.0008 to 0.0012 inches and baked 5 minutes at 250°F.; the enamel topcoat was applied to a thickness of about 0.0018 to 0.0022 inches and baked about 40 minutes at 250°F. The spraying apparatus used was a commercially available conventional type.

Using as component A in Compound I above, an EPDM containing about 4 wt. % of 5-ethylidene-2-norbornene as the third monomer and as component D a naphthenic oil of ASTM type 4 having a viscosity of 58.2 SSU at 210°F., the painted pads showed excellent adhesion of the paint coating to the substrate when the sample was initially subjected to a tape adhesion test carried out as hereinbefore described.

EXAMPLE 3

A series of test pads was prepared as in Example 1, vulcanized for 15 to 30 minutes at 320°–330°F. and primed and painted with a urethane coating as in Example 2 using Compound I of Example 2 except that various EPDM rubbers were used. The 5-ethylidene-2-norbornene termonomer (ENB) content varied from 4 to 9 wt. % and the rubbers had Mooney viscosities of from 35 ML (1 + 8 mins.) 212°F. up to 75 ML (1 + 8 mins.) 260°F. Without exception all grades of these EPDM rubbers possessed the desired properties as evidenced by the fact that the pads successfully passed the "X" cut and water aging tests, previously described.

EXAMPLE 4

In place of Component H of Compound I of Example 2 above a like amount of a bromomethyl octylphenol-formaldehyde resin containing 9.0 wt. % bromine was used; also instead of 5 phr of Component H, 10 and 15 phr were used as well as 10 and 15 phr of Component F (zinc oxide) in place of the 5 phr thereof in Example 2. In all respects, the same excellent test results were secured as described in the Examples 2 and 3.

EXAMPLE 5

Using as component A in Compound I of Example 2 above, mixtures of 70% EPENB terpolymer rubber with 30% butyl, or with 30% chlorobutyl rubber likewise produced the same excellent adhesion properties in urethane coated cured pads as described in the preceding examples and in the previously described thermal shock tests as well.

EXAMPLE 6

Comparative tests were also carried out in which the composition was that of Compound I of Example 2 above except that Component H was replaced with conventional peroxide based, sulfur donor based, low and high sulfur based vulcanization systems containing from 0.0 to 1.5 phr sulfur together with conventional amounts of conventional curing peroxides and coagents and conventional sulfur based accelerators, as shown in Table A. Poor adhesion of urethane based paints to the cured pads resulted. The substrate rubbers employed were those previously described as providing excellent adhesion results using the resin curing systems previously described.

TABLE A

| Additives (phr) | Peroxide | Sulfur donor | High sulfur | Low sulfur |
|---|---|---|---|---|
| 2-mercaptobenzothiazole | — | — | 0.5 | 0.5 |
| Sulfur | — | — | 1.5 | 0.5 |
| Tetramethyl thiuramdisulfide | — | 2 | 1.5 | — |
| 4,4'dithiodimorpholine | — | 2 | — | — |
| Bis(t-butylperoxy) diisopropyl benzene (40% active) | 8 | — | — | — |
| Ethylene dimethacrylate | 2 | — | — | — |
| Zinc diethyl dithiocarbamate | — | — | — | 0.8 |
| MOTS No. 1 | — | — | — | 2.2 |

EXAMPLE 7

In another series of comparative tests using the composition of Example 2 designated as Compound I, component A was varied to include EPENB (4% termonomer) or EPMNB (3 wt. % termonomer or EPDM (1,4-hexadiene termonomer) or EPDM (dicyclopentadiene termonomer); component G was varied to include 0–5.0 phr chlorosulfonated polyethylene and/or 0–10 phr chlorobutyl (1.1–1.3 wt. % chlorine); and component H was varied to include 0–15 phr of a bromomethyl, octylphenol-formaldehyde heat reactive resin and/or 0–12 phr of unhalogenated phenol-formaldehyde heat reactive resin to form the following series of compounds.

II) could be cured and coated as described above. Samples so prepared also showed excellent adhesion of the paint coating to the substrate when subjected to the tests hereinbefore described, i.e., room temperature "X" cut adhesion, aged water immersion adhesion, and thermal shock adhesion tests.

EXAMPLE 8

A series of test pads was prepared by conventional methods using the ingredients shown in Table III, vul-

TABLE II

| Component | Material | COMPOUND | | | | | | | | | | |
|---|---|---|---|---|---|---|---|---|---|---|---|---|
| | | II | III | IV | V | VI | VII | VIII | IX | X | XI | XII |
| $A_I$ | EPENB | 100 | 100 | 100 | 100 | 0 | 0 | 0 | 0 | 100[(1)] | 100[(1)] | 100 |
| $A_{II}$ | EPMNB[(3)] | 0 | 0 | 0 | 0 | 100 | 100 | 100 | 100 | 0 | 0 | 0 |
| B | FEF Carbon Black | 70 | 70 | 70 | 70 | 70 | 70 | 70 | 70 | 70 | 70 | 70 |
| C | SRF Carbon Black | 70 | 70 | 70 | 70 | 70 | 70 | 70 | 70 | 70 | 70 | 70 |
| D | Naphthenic Oil (Flexon 766) | 70 | 70 | 70 | 70 | 70 | 70 | 70 | 70 | 70 | 70 | 70 |
| E | Stearic Acid | 1 | 1 | 1 | 1 | 1 | 1 | 1 | 1 | 1 | 1 | 1 |
| F | Zinc Oxide | 5 | 5 | 5 | 5 | 5 | 5 | 5 | 5 | 5 | 5 | 5 |
| $G_I$ | chlorosulfonated Polyethylene | 0 | 5 | 0 | 5 | 0 | 5 | 0 | 5 | 5 | 5 | 5 |
| $G_{II}$ | Chlorobutyl rubber | 0 | 0 | 10 | 0 | 0 | 0 | 10 | 0 | 0 | 0 | 0 |
| $H_I$ | Bromomethyloctyl phenol formaldehyde resin | 15 | 15 | 15 | 0 | 15 | 15 | 15 | 0 | 15 | 0 | 5[(2)] |
| $H_{II}$ | Unhalogenated phenol-formaldehyde (Amberol ST-137) resin | 0 | 0 | 0 | 12 | 0 | 0 | 0 | 12 | 0 | 12 | 0 |

[(1)]9.0 wt. % 5-ethylidene 2-norbornene termonomer.
[(2)]also contained 1.5 phr sulfur, 1.0 phr tellurium diethyldithiocarbamate and 1.0 phr 2,2'-benzothiazole disulfide.
[(3)]3.0 wt. % 5-methylene-2-norbornene termonomer.

For each of Compounds II through XII three aliquots were used with separate curing times of 7.5, 15 and 30 minutes at 375°F. All cured pads (of 0.125 inch thickness) were then coated with a commercially available automotive urethane paint system as described in Example 2. The finished panels were thereafter subjected to the tests hereinbefore described, i.e., room temperature "X" cut adhesion, aged water immersion adhesion, and thermal shock tests. All prepared compounds showed excellent adhesion of the paint coating to the rubber substrate without regard to which A, which G or which H component was used and without regard to the cure time employed.

On the other hand, test pads the same as above, with the same formulations as Compounds II–VIII, and the same curing treatments, etc. as stated above, but wherein components $A_I$ and $A_{II}$ were respectively an ethylene-propylene-dicyclopentadiene elastomeric terpolymer and an ethylene-propylene-1:4 hexadiene elastomeric terpolymer were tried. Vulcanization of the pads was poor and not sufficiently complete to warrant priming, painting and testing for adhesion.

Substitution of a 9 wt. % ENB terpolymer for the 4 wt. % ENB in the formulation of Compounds III and V of Table II to form Compounds X and XI, respectively, also showed excellent adhesion of the paint coating to the substrates when subjected to the tests hereinbefore described. In addition, it was found that a compound containing 5 phr of a bromomethyl, octylphenolformaldehyde heat reactive resin in combination with a conventional sulfur cure containing 1.5 phr sulfur, 1.0 phr tellurium diethyldithiocarbamate and 1.0 phr 2,2'benzothiazole disulfide (Compound XII of Table canized for 30 minutes at 320°F., primed and painted with a urethane coating as described in Example 2, and tested for adhesion.

TABLE III

| Component | phr | |
|---|---|---|
| | XIII | XIV |
| Butyl rubber (1.5–2.5 mol % unsats). | 80 | — |
| Chlorobutyl (1.1–1.3% Cl) | 20 | 100 |
| SRF-NS Black | 70 | 70 |
| Naphthenic process Oil (Sunpar 2280) | 20 | 20 |
| Zinc Oxide | 5 | 5 |
| Bromomethyl Octyl phenol formaldehyde | 12 | 5 |
| 4,4'dithiodimorpholine | — | 1.0 |

These test pads were found to possess the desired adhesion properties as evidenced by the fact that the pads successfully passed the "X" cut adhesion test, previously described.

What is claimed is:

1. A polymer base painted resin cured elastomer composition comprising:
   A. at least one elastomer selected from the group consisting of butyl rubber and an EPDM rubber wherein the diene termonomer component is an alkylidene norbornene, and the chloro and bromo- derivatives thereof;
   B. a heat reactive phenol-aldehyde resin;
   C. a metal oxide or halide wherein the metal is selected from the group consisting of metals of Groups IIB, IIIB, IVB and VIII;

wherein the composition contains at least one of the foregoing components selected from the group consisting of (A) and (C) which serves as a halogen donor, by containing chemically combined halogen selected from the group consisting of chlorine and bromine; and D. a polyurethane base paint coated on said cured elastomer.

2. A polyurethane base paint resin cured elastomer composition according to claim 1 comprising in addition:

E. a chloro- or bromo- polymer selected from the group consisting of chlorosulfonated polyethylene and the chloro- or bromo- derivatives of polyisobutylene; and wherein the composition contains at least one of the foregoing components selected from the group consisting of (A), (C) and (E) which serves as a halogen donor, by containing chemically combined halogen selected from the group consisting of chlorine and bromine.

3. A polyurethane base painted resin cured elastomer composition as in claim 2 wherein the chloro- or bromo- polymer is chlorosulfonated polyethylene.

4. A polymer base painted resin cured elastomer composition as in claim 1 wherein a plasticizer mineral oil and a filler are present.

5. A polymer base painted resin cured elastomer composition as in claim 3 wherein a plasticizer mineral oil and carbon black filler are present.

6. A polymer base painted resin cured elastomer composition as in claim 1 wherein Component B is a chlorinated or brominated alkylated phenol-formaldehyde resin.

7. A polymer base painted resin cured elastomer composition as in claim 5 wherein the halogen-containing polymer is chlorosulfonated polyethylene and Component B is a bromomethyl alkylated phenol formaldehyde resin.

8. A polymer base painted resin cured elastomer composition as in claim 7 wherein the composition also contains chlorobutyl rubber and a naphthenic plasticizer oil.

9. A polymer base painted resin cured elastomer composition as in claim 6 wherein Component C is an oxide or chloride of zinc or tin.

10. A polymer base painted resin cured elastomer composition as in claim 1 wherein Component A is an ethylenepropylene-alkylidene norbornene rubbery terpolymer, Component B is a bromomethyloctylphenol-formaldehyde resin and Component C is zinc oxide.

11. A polymer base painted resin cured elastomer composition as in claim 10 wherein Component A is an ethylene-propylene-5-ethylidene-2-norbornene rubbery terpolymer, containing carbon black filler, a naphthenic plasticizer oil and a chlorosulfonated polyethylene.

12. A polyurethane coated cured elastomer composition of ethylene-propylene-5-alkylidene-2-norbornene terpolymer rubber, containing per 100 parts of said rubber about 140 parts of carbon black, about one part of stearic acid, about 5 parts of zinc oxide, about 5 parts of chlorosulfonated polyethylene, about 15 parts of bromomethyl, octylphenol-formaldehyde resin and about 70 parts of a naphthenic plasticizer oil.

13. A polyurethane coated cured elastomer composition of butyl rubber containing bromomethyl octyl phenol-formaldehyde resin, zinc oxide, naphthenic plasticizer oil, chlorosulfonated polyethylene, and carbon black filler.

14. A polyurethane coated cured elastomer composition as in claim 13 which also contains chlorobutyl rubber.

* * * * *